United States Patent
Nickols et al.

[11] Patent Number: 4,755,429
[45] Date of Patent: Jul. 5, 1988

[54] COMPOSITE GRAPHITE SEPARATOR PLATE FOR FUEL CELL STACK

[75] Inventors: Richard C. Nickols, East Hartford; Paul R. Watson, Marlborough, both of Conn.

[73] Assignee: International Fuel Cells Corporation, South Windsor, Conn.

[21] Appl. No.: 926,274

[22] Filed: Nov. 3, 1986

[51] Int. Cl.$^4$ .......................... B32B 9/00; B32B 3/00; F16B 5/00; B29C 65/00
[52] U.S. Cl. ........................................ 428/408; 428/33; 428/60; 428/192; 429/34; 429/247; 264/29.1; 156/159; 156/304.5; 156/304.6; 403/340; 403/DIG. 5
[58] Field of Search .................. 428/33, 53, 54, 58, 428/60, 192, 408; 429/34, 129, 247; 403/339, 340, DIG. 5; 156/157, 159, 304.1, 304.5, 304.6; 264/29.1; 423/447.2

[56] References Cited

U.S. PATENT DOCUMENTS

| 3,021,379 | 2/1962 | Jackel | 429/247 X |
| 3,576,700 | 4/1971 | Dell | 428/58 X |
| 4,015,035 | 3/1977 | Blad et al. | 428/60 |
| 4,360,485 | 11/1982 | Emanuelson et al. | 264/29.5 |
| 4,382,113 | 5/1983 | Schwartz et al. | 428/408 |

FOREIGN PATENT DOCUMENTS 95863  5/1985  Japan ..................................... 429/34

*Primary Examiner*—John E. Kittle
*Assistant Examiner*—Susan S. Rucker
*Attorney, Agent, or Firm*—William W. Jones

[57] ABSTRACT

A graphite separator plate for an electrochemical cell stack is formed from component parts which are joined together edge to edge. The edges of the plates are scarfed to increase the bond area and a heat activated fluoropolymer adhesive is used to bond adjacent plates together. This allows production of plates with a larger surface areas thereby improving the economics of the cell stack.

1 Claim, 1 Drawing Sheet

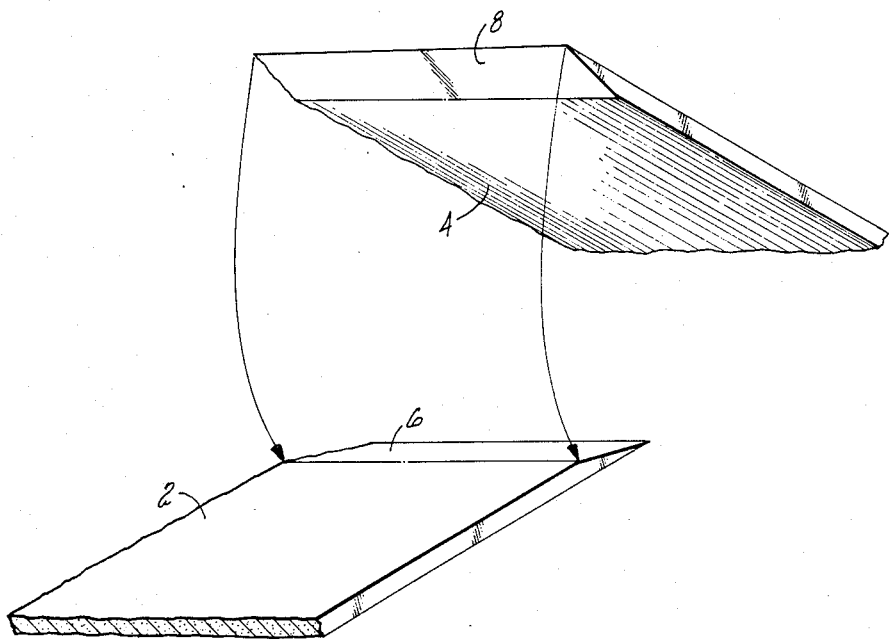

COMPOSITE GRAPHITE SEPARATOR PLATE FOR FUEL CELL STACK

TECHNICAL FIELD

This invention relates to an improved plate component for electrochemical cell stacks, and more particularly, to larger graphite plates which are formed from edge bonded small component plates.

BACKGROUND ART

Electrochemical cell stacks such as fuel cell stacks are formed with a repeating series of thin flat plates. Each cell in the stack has plate components, and the individual cells must be separated from each other by impervious separator plates which prevent reactant leakage from one cell to the next. In a fuel cell, the plates must be formed from an electrically conductive material, and the preferred material is a carbon-filled resin which is molded in a press into the plate form. The plates are relatively thin, for example, from about 0.030 inch to about 0.100 inch in thickness, and are fragile. From an economy standpoint, the greater the area of the plates, the less expensive the power plant would be because fewer plates would be needed to produce a stack with any given square footage of electrode surface. At present however, size limitations on the plates are imposed by press capabilities, material shrinkage during forming and the difficulty in handling larger size thin fragile plate components. Another problem which arises when producing larger unitary plates relates to scrap. When a larger plate is found to be flawed, the entire plate must be scrapped. This problem thus tends to increase costs incurred in using the larger plates when the objective of the larger plates is to reduce costs. At the present, the largest plates which can be feasibly produced are square in shape and about four feet on a side.

Graphite separator plates are formed for use in electrochemical cells in accordance with this invention by forming smaller component plates and then edge bonding them together to form larger plates for use in the cell stack. These plates must maintain their integrity in a phosphoric acid environment of the acid fuel cell, and must also be uneffected by the high operating temperatures of electrochemical cells. In view of the fact that the plates are quite thin, the edge joint between adjacent component plates is a scarfed cut, tapered at an angle in the range of about 15° to about 45°. The scarf angle is preferably kept as small as possible, particularly when the plates are in the lower thickness range. The surface on the scarf cuts should display a controlled roughness which allows the adhesive to form a sturdy mechanical bond between adjacent plates without requiring an overly thick layer of adhesive. A 32 microinch finish on the scarf cuts has been found to provide a suitably rough surface to allow the formation of a strong bond between adjacent plates. Care must be taken not to make the scarf cuts too rough lest leakage paths be formed across the joint. The surface finish on the scarf cuts should be maintained in the range of about 16 microinch to about 63 microinch. The adhesive used to bond the plates together may be substantially any fluoropolymer resin which is activated by heat. The resin is coated onto the scarf surfaces and the latter are pressed together under heat and pressure to bond the joint. The resin actually melts and fills all of the interstices on the scarfs during the bonding procedure whereby a mechanical bond is formed. One particular resin which has been found to be satisfactory is a fluoropolymer sold by Dupont under the Trademark FEP 120.

It is therefore an object of this invention to provide an improved plate component for an electrochemical cell stack.

It is a further object of this invention to provide a plate component of the character described which has a larger surface area so as to lower the cost of manufacturing the stack.

It is an additional object of this invention to provide a plate component of the character described which is formed from a plurality of smaller plate components joined together edgewise.

It is another object of this invention to provide a plate component of the character described wherein the edge joint between the plate components are scarfed cuts having suitably rough surfaces to promote secure bonding with a heat activated resinous adhesive.

It is yet another object of this invention to provide an improved plate of the character described which the adhesive is a fluoropolymer resin.

These and other objects and advantages of the invention will become more readily apparent from the following detailed description of a preferred embodiment of a composite plate formed in accordance with this invention when taken in conjunction with the accompanying drawing.

BRIEF DESCRIPTION OF THE DRAWING

The drawing is a fragmented exploded perspective view of adjoining portions of component plates and the joint therebetween.

BEST MODE FOR CARRYING OUT THE INVENTION

The drawing shows two component plates 2 and 4 which will be joined together to form a portion of a larger plate. The plates 2 and 4 are made from press molded carbon in a resinous binder which has been graphitized. The thickness of the plates 2 and 4 is in the range of about 0.030 to about 0.040 inch. The edges 6 and 8 to be joined together were scarf cut at mating angles of about 15°. The edges 6 and 8 were cut mechanically and given a 32 microinch finish so as to provide a suitably roughened surface for gripping by the adhesive. The adhesive FEP 120 ® was spread thinly and evenly over both edges 6 and 8 whereupon the edges 6 and 8 were butted together, held at a pressure of 350 psi at temperatures ranging between 590° F. and 625° F. for about five minutes. The assembly was then cooled to less than 400° F. and the pressure released. The flexural strength of the resulting plate at the joint was 4100 psi compared to 5900 psi for a one piece plate, and a performance requirement of 4000 psi. Hydrogen permeability at the joint was 0.02 cc/Ft$^2$ - Sec. compared to 0.01 for a one piece plate. the maximum permissible hydrogen permeability for a graphite separator plate is 0.06 cc/Ft$^2$ - Sec. The composite plate thus possessed acceptable performance characterisitcs. As for the fabrication requirements, the adhesive is preferably applied in a thickness range of about 0.0003 inch to about 0.001 inch on each scarf cut, the perferred thickness being about 0.0005 inch. The bonding pressure applied to the joint can be in the range of about 250 psi to about 400 psi, the preferred pressure being 350 psi, and the bonding temperature can be in the range of about 575° F. to about 650° F.

As previously noted, square unitary plates of about four feet on a side can be produced by existing press molds. It will be appreciated that component plates of, for example, three feet on a side can be easily produced. Using such plates to form a larger compound square plate, it is apparent that a thirty six square foot plate can be easily produced with four nine square foot component plates edge bonded in accordance with this invention. Using such plates one could form a stack with one half as many plates and yet having about a 10% increase in active plate square footage. Thus, more powerful stacks having half as many components can be formed with the compound plates of this invention.

Since many changes and variations of the disclosed embodiment of this invention may be made without departing from the inventive concept, it is not intended to limit the invention otherwise than as required by the appended claims.

We claim:

1. A compound plate for use in a high temperature acidic electrochemical cell environment, said plate being formed from a plurality of thin press molded component plates formed from carbon in a resinous binder, each of said component plates being bonded to at least one adjacent component plate along a joint formed at edges of said component plates wherein said edges are formed with tapered scarf cuts having matched included angles of about 15° and having a surface finish in the range of about 16 microinch to about 63 microinch to promote adhesive bonding, said tapered scarf cuts being coated with a fluoropolymer resin adhesive, overlapped in face-to-face mating contact, and bonded together under heat and pressure sufficient to melt said resin to form a mechanical bond between said component plates at said joint, said joint having a hydrogen permeability of 0.02 $cc/Ft^2Sec.$ and a flexural strength of about 4100 psi.

* * * * *